Aug. 21, 1934.   H. M. NICHOLLS   1,970,573
LIQUID DISPENSER
Filed Aug. 24, 1933   2 Sheets-Sheet 1
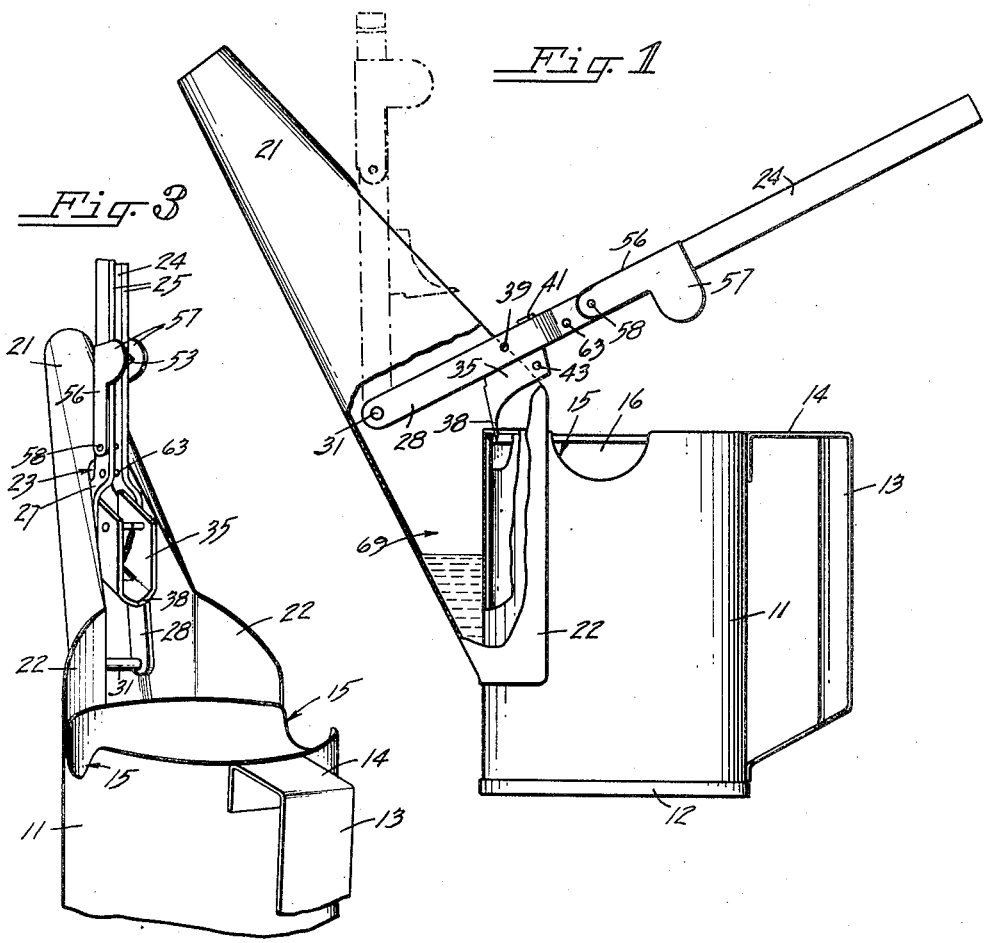
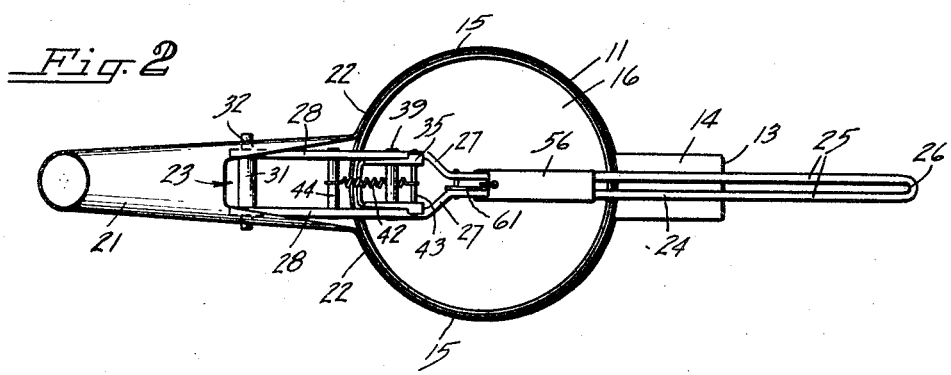
INVENTOR
Henry M. Nicholls
BY
ATTORNEYS Aug. 21, 1934.   H. M. NICHOLLS   1,970,573
LIQUID DISPENSER
Filed Aug. 24, 1933   2 Sheets-Sheet 2
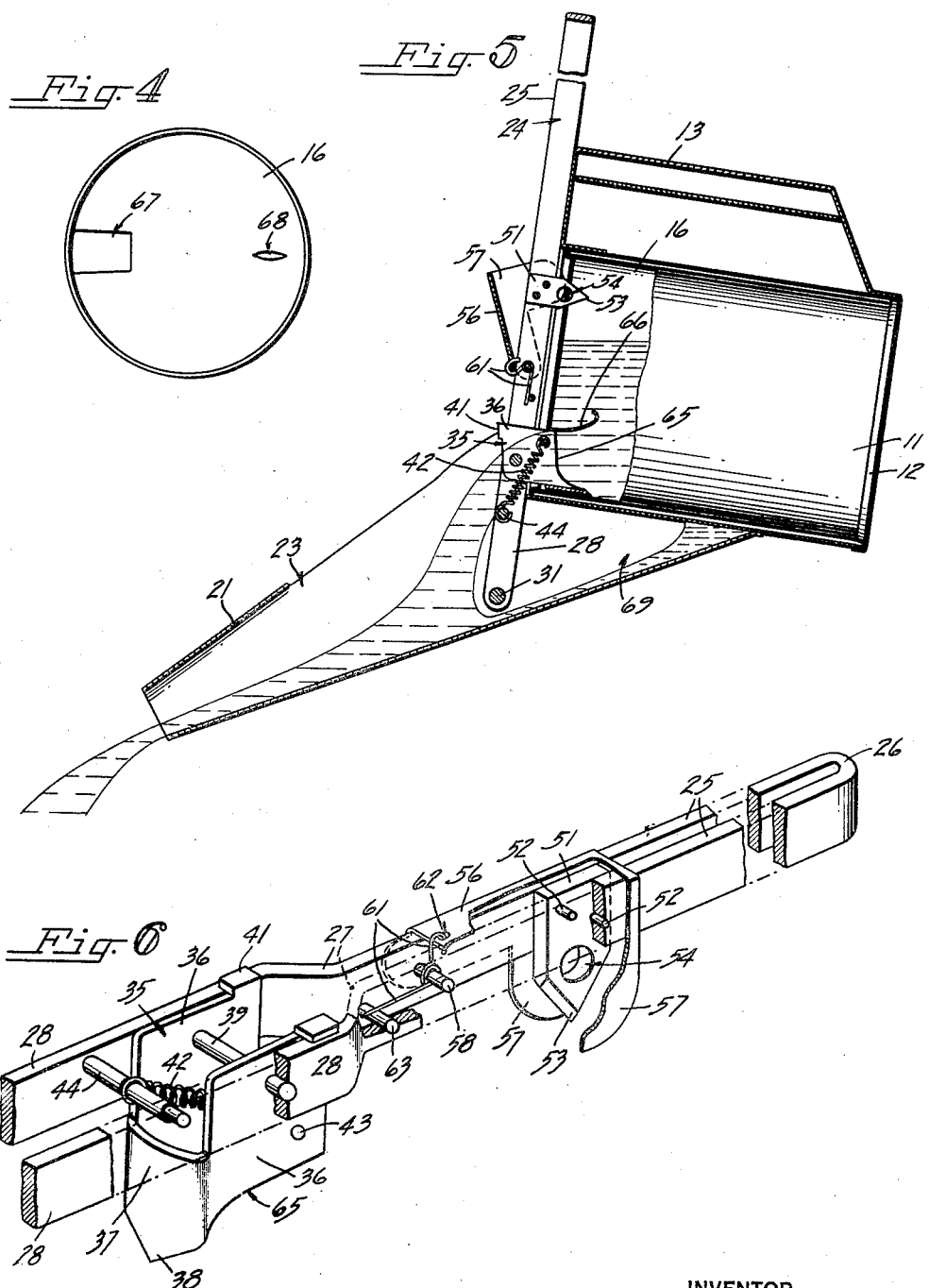
INVENTOR
Henry M. Nicholls
BY
ATTORNEYS Patented Aug. 21, 1934

1,970,573

UNITED STATES PATENT OFFICE 1,970,573

LIQUID DISPENSER

Henry M. Nicholls, Chicago, Ill., assignor to American Can Company, New York, N. Y., a corporation of New Jersey Application August 24, 1933, Serial No. 686,625

16 Claims. (Cl. 221—23)

The present invention relates to liquid dispensing devices and has particular reference to the opening of sealed receptacles containing liquids such as lubricating oil and to the dispensing of the liquid contents.

An object of the invention is the provision of a liquid dispenser which is adapted to receive sealed liquid filled receptacles such as cans of lubricating oil and to hold them while opening and venting by a simple movement of the opening elements, after which the opened can, still held in the holder, is emptied of its contents by a simple tipping action of the device.

A further object of the invention is the provision of liquid dispensers of the character described having pouring spouts and can opener elements operable within the spouts for cutting dispenser openings in the cans from which the contents may be rapidly dispensed into and from the pouring spout.

Provision is also made for catching the drip or drain of the liquid adhering to the walls of the pouring spout following the emptying of a can of its contents through the spout after it has been opened.

A still further object of the invention is the provision of a movable hollow cutter so mounted and controlled during the opening of the filled can as to effect a close cutting of the can parts adjacent its interior wall and forming an unrestricted opening in the can so that a more complete dispensing of its contents may be had.

The invention further contemplates the provision of opening devices and dispensers of the character described which also act to retain the can in place during both the opening and the dispensing operations.

Numerous other objects and advantages of the invention will be apparent as it is better understood from the following description, which, taken in connection with the accompanying drawings, discloses a preferred embodiment thereof.

Referring to the drawings:

Figure 1 is a side elevation of a liquid dispensing device embodying the present invention, parts being broken away to more clearly illustrate its construction;

Fig. 2 is a plan view of the device illustrated in Fig. 1;

Fig. 3 is a perspective view of dispenser parts arranged for the insertion of a sealed can;

Fig. 4 is a top plan view of a sealed can after opening illustrating the dispensing and vent openings produced by the opening elements of the device;

Fig. 5 is a longitudinal sectional view of the dispensing device shown in pouring position and illustrating dispensing of the liquid contents from the can; and Fig. 6 is a perspective view of a portion of the opening elements of the device and their mountings, parts being broken away.

A preferred embodiment of the invention, such as is illustrated in the drawings, comprises a dispensing holder 11 open at the top and closed by a bottom member 12. This holder is preferably provided with a handle 13 formed with a horizontal straight upper section 14 disposed in a horizontal line with the upper rim of the holder. The side wall of the holder 11 adjacent its upper rim is cut away at 15 and a sealed receptacle or can 16 containing a liquid such as lubricating oil may be placed into the holder, the openings 15 permitting holding of the container by the fingers during such positioning.

A pouring spout 21 is provided having a pair of side wings 22 at the bottom of the spout which are secured to the exterior front wall of the holder 11. This pouring spout extends upwardly and at an angle and is generally conical in form. The upper end of the pouring spout terminates in a tubular mouth or discharge opening and below this end the spout is cut away along its top to provide a clearance or transverse opening 23 for an opening lever 24.

The opening lever 24 is preferably formed with spaced rear legs 25 connected at the back in a rounded section 26, these legs providing a handle for the lever. The legs 25 merge into inclined slightly rounded connection sections 27 which are also integral parts with front spaced legs 28. The front ends of the latter are connected by a transversely disposed pin 31 which is pivotally connected at 32 in side walls of the pouring spout 21.

The opening lever 24 has two positions of rest, one a vertical open position indicated in dotted lines in Fig. 1 and further illustrated in Fig. 3, and a second or closed position illustrated in Fig. 5. The rear legs 25 of the lever rest upon the handle section 14 when the opening lever is in its closed position. The inclined sections 27 of the opening lever engage against and snap under the top wall edges of the pouring spout 21 adjacent its opening 23 when the opening lever is moved into open position and these edges catch and hold it, as best illustrated in Fig. 3.

It is when the opening lever 24 is in its open or vertical position that the filled and sealed can 16 is inserted within the holder 11. The can is a snug fit within the holder as it rests upon the bottom 12, its upper edge being a slight distance below the top rim of the holder. In this position the opening and venting of the can is effected by a shifting of the lever 24 it being moved down into its closed or horizontal position over the can, the legs 25 being used as a handle.

A hollow puncturing member or cutter 35 (Fig. 6) is provided for cutting a dispensing opening in the can. This cutter comprises spaced side walls 36 joined by a front curved part 37 which terminates in a depending piercing point 38. The curve of the front wall of the cutter is substantially the same as the curvature of the inner side wall of the can.

The hollow cutter is located between the front spaced legs 28 of the opening lever and is pivotally mounted on a horizontal pin 39 which is anchored at its ends in the front legs. Each side wall 36 is bent outwardly above the upper edge of its adjacent confining leg 28 as a stop lug 41 and these lugs rest upon the upper edges of the lever legs at all times except when the cutter is doing its cutting.

The cutter 35 is yieldingly held in the position illustrated in Fig. 6 by a spring 42 which is connected between a pin 43 extending across and held in the cutter walls 36 and a pin 44 anchored in the spaced legs 28 of the opening lever 24.

The lever 24 also carries a vent blade 51 which is located between the rear legs 25 of the opening lever, being held in place by pins 52 seated in the spaced leg walls 25. This vent blade is provided with a pointed and beveled, depending piercing edge 53 which projects below the opening lever, the blade being cut through with a transverse opening 54.

The piercing edge of the vent blade 51 is enclosed most of the time and for this purpose there is provided a protecting shield 56 formed with side walls 57 normally extending down below the piercing point. These side walls are pivotally mounted on a pin 58 carried in the spaced legs 25 of the opening lever.

When shielded the parts are in the position illustrated in Figs. 1 and 6, the shield frame being held by a spring 61 down against the lever 24. One end of the spring is inserted in an opening 62 formed in the upper wall of the shield member 56, and the opposite end extends over and engages a pin 63 held in the spaced legs 25 of the opening lever.

After the can 16 is inserted within the holder 11 the opening lever is brought down from its vertical position (dotted lines in Fig. 1) into the full line position of that figure. In this latter position the piercing point 38 of the cutter engages the top of the can 16 just inside and adjacent its side wall.

Further depression of the lever forces the hollow cutter 38 into the can wall, the spring 42 of the cutter holding its front wall 37 against the interior wall of the can, the cutter pivoting on its mountings in the opening lever, the spring 42 yielding just enough to properly hold the front cutting edges for a close cut along the interior wall of the can.

During this cutting action curved lower edges 65 of the cutter force against the cut metal of the can top and curl the severed part, designated by the numeral 66, back and away from the can wall. The finally opened position of this metal is illustrated in Fig. 5. A clean cut dispensing opening 67 (Fig. 4) is thus produced in the top wall of the can 16, the hollow cutter 35 remaining in the opening as shown in Fig. 5.

As the opening lever 24 approaches the end of its downward stroke prior to coming into its closed position (Fig. 5) the bottom rounded edges of the side walls 57 of the vent shield 56 strike against the top of the can and are stopped while the continued movement of the opening lever causes the shield to pivot on the pin 58. The piercing point 53 of the vent blade 51 engages and enters into the wall of the can during such continued movement.

A vent opening 68 (Fig. 4) is thus produced in the can top on the opposite side from the dispensing opening 67 and the bent blade 51 remains in this opening 68 while the opening lever is in its closed position. By reason of the opening 54 in the blade 51, air passes through the opening from the outside and enters into the can above the liquid.

The dispensing device may now be lifted by its handle 13 and the handle end of the opening lever 24 at such time is preferably held down in place against the handle part 14. The dispenser with its enclosed and opened can is then tipped into the position illustrated in Fig. 5 for the discharge of its liquid contents.

The liquid flows from the can out through the hollow cutter 35 and through the dispensing opening 67 formed in the can top and thence through the pouring spout 21 and out through its discharge end where it is directed to a desired place of deposit. During such flow of the liquid from the can, air entering through the opening 54 of the vent blade 51 and through the vent opening 68 in the can top displaces the liquid as it is drawn off, thus permitting an easy dispensing action.

Where the dispensing device is used for lubricating oil or similar substances some of the oil adheres to the inside wall of the pouring spout and provision is made for permitting this oil to drain back and to be confined within the lower end of the pouring spout 21. For this purpose there is provided a chamber 69 (Figs. 1 and 5) confined between the lower part of the pouring spout 21 and the exterior wall of the holder 11 where it extends inside of the pouring spout between the wings 22. This clinging oil gradually flows back or drains into the chamber 69 when the dispensing device is again brought into its upright or normal position (Fig. 1).

Following the dispensing action and the emptying of the can, the opening lever 24 is returned to its open or vertical position within the pouring spout 21 and the empty can 16 may then be lifted out of the holder, the fingers engaging the can within the clearance openings 15 in the side walls of the holder. The drained oil collected within the chamber 69 remains in this chamber until the next can is opened and dispensed, at which time this oil flows down the inside wall of the pouring spout where it joins with the oil flowing from the can being emptied. In this repeated use of the dispensing device none of the liquid being dispensed flows down the outside walls or soils exterior parts of the dispenser and therefore it does not come in contact with the hands.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. A liquid dispensing device comprising, in combination, a holder adapted to receive a sealed receptacle containing a liquid to be dispensed, a pouring spout associated with said holder, an opening lever having one end operable in said spout, and puncturing means carried by said lever and insertable in the receptacle confined in said holder for forming an opening in the receptacle to permit dispensing of its liquid contents through said spout.

2. A liquid dispensing device comprising, in combination, a holder adapted to receive a sealed receptacle containing a liquid to be dispensed, a pouring spout associated with said holder, an opening lever having one end operable in said spout, and a puncturing member and a vent blade carried by said lever and insertable in the receptacle confined in said holder for forming openings in the receptacle to permit venting of the same and dispensing of its liquid contents through said spout.

3. A liquid dispensing device comprising, in combination, a holder adapted to receive a sealed receptacle containing a liquid to be dispensed, a pouring spout secured to one side of said holder, an opening lever pivotally connected with said spout, and a puncturing member mounted on said lever and insertable in the receptacle confined in said holder upon pivoting of said lever for forming an opening in the receptacle to permit dispensing of its liquid contents through said spout.

4. A liquid dispensing device comprising, in combination, a holder adapted to receive a sealed receptacle containing a liquid to be dispensed and having a portion of its side wall cut away to permit easy insertion and removal of the receptacle, a pouring spout secured to said holder and extending outwardly beyond its wall, an opening lever having one end pivotally connected in said spout at a point above the rim of said holder, and puncturing means carried by said lever and insertable in the receptacle confined in said holder for forming an opening in the receptacle to permit dispensing of its liquid contents over said holder rim and through said spout.

5. A liquid dispensing device comprising, in combination, a holder adapted to receive a sealed receptacle containing a liquid to be dispensed, a pouring spout secured to one side of said holder, an opening lever pivotally connected with said spout at a point just above the rim of said holder, and a puncturing member mounted on said lever and insertable in the receptacle confined in said holder upon pivoting of said lever for forming an opening in the receptacle, the said lever being adapted to rest on the rim of said holder after the opening operation to hold the opened receptacle within the holder while dispensing its liquid contents through said spout.

6. A liquid dispensing device comprising, in combination, a holder adapted to receive a sealed receptacle containing a liquid to be dispensed, a pouring spout associated with said holder, an opening lever having one end operable in said spout, and a hollow puncturing cutter mounted on said lever and adapted to enter a wall of said receptacle upon movement of said lever for forcing back a part of said wall and for forming a dispensing opening through which the liquid contents flow out by way of said cutter and said pouring spout when the holder with its opened receptacle is moved into pouring position.

7. A liquid dispensing device comprising, in combination, a holder adapted to receive a sealed receptacle containing a liquid to be dispensed and having a lifting handle, an opening lever associated with said holder and having relative movement therewith, said lever having two positions, an open position to permit insertion of the receptacle in said holder and a closed position down against said handle, and a puncturing cutter mounted on said lever and adapted to enter a wall of said receptacle when said lever is moved into its closed position for forming a dispensing opening for the receptacle.

8. A liquid dispensing device comprising, in combination, a holder adapted to receive a sealed receptacle containing a liquid to be dispensed, a pouring spout associated with said holder, an opening lever associated with said holder and having relative movement therewith, said lever having two positions, an open position to permit insertion of the receptacle in said holder and a closed position for holding the receptacle in said holder, catch elements associated with said pouring spout for holding said opening lever in its open position, and a puncturing cutter mounted on said lever and adapted to enter a wall of said receptacle when said lever is moved into its closed position for forming a dispensing opening for the receptacle.

9. A liquid dispensing device comprising, in combination, a holder adapted to receive a sealed receptacle containing a liquid to be dispensed, a pouring spout associated with said holder and having a discharge opening and a transverse opening, an opening lever pivotally mounted in said pouring spout adapted for movement into an open position within the transverse opening of said spout and into a closed position on said holder and over said inserted receptacle, the side walls adjacent said transverse spout opening springing against said lever to hold it in open position while the receptacle is inserted, and a cutter carried by said lever and adapted to open the receptacle when the said lever is brought into its closed position.

10. A liquid dispensing device comprising, in combination, a holder adapted to receive a sealed receptacle containing a liquid to be dispensed, a pouring spout associated with said holder, an opening lever having one end pivotally mounted in said spout, a puncturing member pivotally mounted on said lever and having a piercing point insertable in the top wall of the receptacle confined in said holder when said lever is moved, and means for keeping said piercing point close to the inner side wall of the receptacle to form an opening for dispensing the liquid contents therethrough and from the receptacle.

11. A liquid dispensing device comprising, in combination, a holder adapted to receive a sealed receptacle containing a liquid to be dispensed, a pouring spout connected with said holder and extending along one side and above the same, an opening lever pivotally connected in said spout beyond the wall of said holder, a hollow cutter pivotally connected with and carried by said lever and insertable in the receptacle as it is confined in said holder for providing a dispensing opening for the liquid contents of the receptacle, and yielding means associated with said lever and said hollow cutter for holding the latter in container wall cutting position during the opening of the receptacle.

12. A liquid dispensing device comprising, in combination, a holder adapted to receive a sealed receptacle containing a liquid to be dispensed, an opening lever associated with and having movement relative to said holder, a hollow cutter pivotally connected with and carried by said lever and insertable in the receptacle as it is confined in said holder for providing a dispensing opening, yielding means for holding said hollow cutter in cutting position close to the inner wall of the receptacle during its opening, and stops formed on said cutter for holding it against the action of said yielding means when out of cutting position.

13. A liquid dispensing device comprising, in combination, a holder adapted to receive a sealed receptacle containing a liquid to be dispensed, an opening lever movably associated with said holder, a hollow cutter and a vent blade both carried by said lever and insertable in the receptacle as it is held in said holder for forming a dispensing opening and a vent opening to dispense its liquid contents, and a pivoted shield for said vent blade adapted to engage the receptacle during the opening thereof and move out of shielding position of said vent blade.

14. A liquid dispensing device comprising, in combination, a holder adapted to receive a sealed receptacle containing a liquid to be dispensed, a pouring spout secured to said holder and extending upwardly at an angle, an opening lever formed with parallel spaced legs, one end being pivotally connected in said spout, a hollow cutter pivotally mounted between the legs of said lever, and a vent blade fixedly secured between the legs of said lever, said cutter and said blade cooperating upon pivotal movement of said lever to form a dispensing opening and a vent opening in the wall of the receptacle whereby dispensing of its liquid contents is had through said dispensing opening and said spout when said holder with its opened receptacle is brought into dispensing position.

15. A liquid dispensing device comprising, in combination, a holder adapted to receive a sealed receptacle containing a liquid to be dispensed, a pouring spout secured to said holder, a puncturing member associated with said holder and insertable in the receptacle held in said holder, means for forcing said puncturing member into receptacle puncturing position to open the latter, the tilting of said holder with its confined and opened receptacle discharging the liquid contents through said pouring spout, and means associated with said holder and said spout for catching the drain of the liquid from the walls of the spout when the receptacle has been emptied and said holder has again been brought into its non-pouring position.

16. A liquid dispensing device comprising, in combination, a holder adapted to receive a sealed receptacle containing a liquid to be dispensed, a pouring spout secured to and partially located outside of said holder, a puncturing member associated with said holder and insertable in the receptacle as the latter is held in said holder, means for forcing said puncturing member into the receptacle to open it so that tilting of said holder and its confined and opened receptacle discharges the liquid contents through said pouring spout, and a well formed in said pouring spout outside of the wall of said holder for catching clinging liquid on the inside of said spout as it drains back when said holder is returned into its non-pouring position.

HENRY M. NICHOLLS.